US008486496B2

(12) United States Patent
Ko et al.

(10) Patent No.: US 8,486,496 B2
(45) Date of Patent: Jul. 16, 2013

(54) METHOD OF PREPARING WEAR-RESISTANT COATING LAYER COMPRISING METAL MATRIX COMPOSITE AND COATING LAYER PREPARED THEREBY

(75) Inventors: Kyung-Hyun Ko, Suwon (KR); Ha-Yong Lee, Suwon (KR); Jae-Hong Lee, Pyungtack (KR); Jae-Jung Lee, Suwon (KR); Young-Ho Yu, Gwangmyeong (KR)

(73) Assignee: SCK Solmics Co., Ltd., Pyungtaek (KR)

( * ) Notice: Subject to any disclaimer, the term of this patent is extended or adjusted under 35 U.S.C. 154(b) by 1677 days.

(21) Appl. No.: 11/911,416

(22) PCT Filed: Apr. 5, 2006

(86) PCT No.: PCT/KR2006/001248
§ 371 (c)(1), (2), (4) Date: Oct. 12, 2007

(87) PCT Pub. No.: WO2006/107172
PCT Pub. Date: Oct. 12, 2006

(65) Prior Publication Data
US 2008/0220234 A1 Sep. 11, 2008

(30) Foreign Application Priority Data
Apr. 7, 2005 (KR) ........................ 10-2005-0028971

(51) Int. Cl.
*B32B 15/02* (2006.01)
*B32B 18/00* (2006.01)
*C23C 26/00* (2006.01)
*B05D 1/12* (2006.01)

(52) U.S. Cl.
USPC ............ 427/427; 428/469; 428/698; 428/702

(58) Field of Classification Search
None
See application file for complete search history.

(56) References Cited

U.S. PATENT DOCUMENTS 3,775,180 A * 11/1973 Hirata et al. ...................... 134/7
3,974,245 A * 8/1976 Cheney et al. .................. 75/336
4,938,991 A * 7/1990 Bird .............................. 427/190
5,419,976 A * 5/1995 Dulin ............................ 428/570

(Continued)

FOREIGN PATENT DOCUMENTS

RU 2166421 C1 * 5/2001

*Primary Examiner* — John J Zimmerman
(74) *Attorney, Agent, or Firm* — Lexyoume IP Meister, PLLC.

(57) ABSTRACT

The invention provides a method of preparing a wear-resistant coating layer comprising metal matrix composite and a coating layer prepared by using the same and more particularly, it provides a method of preparing a wear-resistant coating layer comprising metal matrix composite, which comprises the steps of providing a base material, preparing a mixture powder comprising a metal, alloy or mixture particle thereof having an average diameter of 50 to 100 um and a ceramic or mixture particle thereof having an average diameter of 25 to 50 um in a ratio of 1:1 to 3:1 by volume, injecting the mixture powder into a spray nozzle for coating, and coating the mixture powder on the surface of the base material by accelerating the mixture powder in the state of non-fusion at a rate of 300 to 1,200 m/s by the flow of transportation gas flowing in the nozzle and a coating layer prepared by using the same whereby the coating layer with high wear resistance and excellent resistance against fatigue crack on the surface of the base material without causing damages such as heat strain to the base material during the formation of the coating layer can be provided.

12 Claims, 7 Drawing Sheets

U.S. PATENT DOCUMENTS

| | | | | |
|---|---|---|---|---|
| 5,837,048 | A * | 11/1998 | Kelley | 106/197.01 |
| 6,139,913 | A * | 10/2000 | Van Steenkiste et al. | 427/191 |
| 6,283,386 | B1 * | 9/2001 | Van Steenkiste et al. | 239/427 |
| 6,723,387 | B1 * | 4/2004 | Kear et al. | 427/450 |
| 6,750,073 | B2 * | 6/2004 | Lee et al. | 438/29 |
| 6,808,817 | B2 * | 10/2004 | Gillispie et al. | 428/469 |
| 7,056,467 | B2 * | 6/2006 | Kang et al. | 264/455 |
| 7,820,238 | B2 * | 10/2010 | DeBiccari et al. | 427/190 |
| 2003/0175559 | A1 * | 9/2003 | Morelli et al. | 428/702 |
| 2003/0219542 | A1 * | 11/2003 | Ewasyshyn et al. | 427/421 |
| 2003/0228414 | A1 * | 12/2003 | Smith et al. | 427/180 |
| 2004/0058065 | A1 * | 3/2004 | Steenkiste et al. | 427/180 |
| 2005/0079286 | A1 * | 4/2005 | Kashirin et al. | 427/180 |
| 2006/0013962 | A1 * | 1/2006 | Fuller et al. | 427/446 |
| 2006/0223931 | A1 * | 10/2006 | Park et al. | 524/439 |
| 2007/0099014 | A1 * | 5/2007 | McCullough et al. | 428/469 |
| 2007/0240603 | A1 * | 10/2007 | Ko et al. | 106/1.05 |
| 2009/0120539 | A1 * | 5/2009 | Ko et al. | 148/513 |

* cited by examiner

METHOD OF PREPARING WEAR-RESISTANT COATING LAYER COMPRISING METAL MATRIX COMPOSITE AND COATING LAYER PREPARED THEREBY

TECHNICAL FIELD

The present invention relates to a method of preparing a wear-resistant coating layer comprising metal matrix composite and a coating layer prepared by using the same and more particularly, it relates to a method of providing a wear-resistant coating layer with high resistance against fatigue crack on the surface of a base material without causing damages such as heat strain to the base material during the formation of the coating layer and a coating layer prepared thereby.

BACKGROUND ART

To extend life of mechanical parts used in abrasive environment such as friction, fatigue, corrosion or erosion, methods of curing the surface of the parts or coating them with wear-resistant materials have been used.

As the coating materials to improve wear resistance, materials having high hardness, that is, ceramic materials such as oxides, for example, alumina, carbides, for example, SiC or TiC, and nitrides for example, $Si_3N_4$, TiN are mostly used.

As the typical mechanical parts with wear-resistant coating structure, car engine blocks and related parts can be mentioned and particularly, to suppress the abrasion of the inner walls of cylinder bores, abundant technologies have been developed. For example, there can be mentioned Korean Patent Laid-Open No. 1997-0045010, 1998-017171, and 2003-0095739. Particularly, Korean Patent Laid-Open No. 1997-0045010 discloses a method of forming a coating membrane instead of prior cast iron liners on the inner walls of cylinder bores and in this method, wear resistance is improved by forming coating powders comprising ceramics and their mixtures on the inner walls of bores by spray pyrolysis using plasma or arc as heat source.

Korean Patent Laid-Open No. 1998-017171 discloses a method of forming wear-resistant coating layer on the bore side of aluminum cylinder blocks by plasma spray pyrolysis using silicone carbide particles.

Korean Patent Laid-Open No. 2003-0095739 discloses a method of forming a coating membrane by spraying a powder composition for spray coating on the inner walls of stainless cylinder bores while fusing it with heat source of high temperature, and the powder composition for spray coating is a mixture of alumina and zirconia.

As described above, numerous attempts to form a wear-resistant coating on metal base materials with excellent wear-resistant ceramic materials have been conducted, but all of these methods are mainly based on plasma or electric arc spray pyrolysis. Such spray methods provide base materials with powder particles by heating the powder particles to be coated nearly around or above fusion point thereby fusing at least a part thereof.

Therefore, as the ceramic particles to be coated onto base materials are heated to high temperature around 1000° C., which is a fusion temperature of a normal ceramic particle, and then provided to base materials by contact, they cause damages by heat shock to the base materials during the coating process, induce residual stress during the cooling process thereby decreasing adhesion and shorten the life of the parts.

Also, due to the particle spray of high temperature, there is an increased risk with the handling of spray machine and complicated operation line is inevitable. In addition, the fused particles of high temperature might react with impurities on metal matrix or its surface and form another compounds, thereby adversely affecting the properties of the material.

Meanwhile, periodical stress occurs by periodical cycling and thus, reciprocating machines and related parts receive continuously, repeatedly cycling stress of numerous times by engine rotation when engine works and as a result, periodical stress gives rise to fatigue-crack in the related parts of thermal engines together with localized heating in the parts and ultimately shortens the life of the parts. For instance, insert grooves which are used to insert glow plugs are formed around cylinder grooves in diesel engine blocks, wherein the region between the insert grooves and cylinder grooves has a high possibility of destruction by fatigue crack due to shortened interval and high temperature.

Hence, in many occasions, it is required that parts for use in thermal engines such as reciprocating engines and gas turbines have good resistance against fatigue crack as well as wear resistance. However, in most prior coating technologies, ceramic was coated alone. In such cases, heat transfer to metal matrix is not properly performed and high temperature is maintained. As a result, crack occurrence due to fatigue is increased and resistance against fatigue is thus decreased although wear resistance might be improved.

DISCLOSURE OF INVENTION

Technical Problem

In order to solve the problems of the prior arts, it is an object of the present invention to provide to a method of prepare an optimum coating layer which is not likely to cause heat strain or damages due to heat shock to a base material and at the same time, has excellent wear resistance, and the coating layer.

Also, it is an object of the invention to provide a method of preparing a coating layer with excellent resistance against crack generation due the fatigue of the coating layer by preventing heat from being accumulated in the coating layer and inhibiting crack production between the base material and coating layer or inside the coating layer, and the coating layer.

Technical Solution

To achieve the aforementioned objects, the invention provides a method of preparing a wear-resistant coating layer comprising metal matrix composite, the method comprising the steps of:

providing a base material;

preparing a mixture powder comprising a metal, alloy or mixture particle thereof having an average diameter of 50 to 100 um and a ceramic or mixture particle thereof having an average diameter of 25 to 50 um in 1:1 to 3:1 by volume;

injecting the mixture powder into a spray nozzle for coating; and coating the mixture powder on the surface of the base material by accelerating the mixture powder in the state of non-fusion at a rate of 300 to 1,200 m/s by the flow of transportation gas flowing in the nozzle.

Also, the invention provides a wear-resistant coating layer comprising metal matrix composite prepared by the method above.

Advantageous Effects

According to the method of preparing a wear-resistant coating layer comprising metal matrix composite and the coating layer prepared using the same in the invention, a coating layer having optimum wear resistance and excellent resistance against fatigue crack can be obtained and in addition, its heat fatigue properties can be improved. The coating layer prepared can be used as a surface coating of mechanical parts used in abrasive environments or engine parts operated under periodical heat stress environments. It improves wear resistance properties and fatigue properties by inhibiting crack generation and propagation and additionally, it can minimize the peeling between the coating layer and the base material or the crack of the coating layer by controlling thermal expansion coefficients and improving heat conductivity properties, thereby improving resistance against heat fatigue crack.

In addition, the coating layer can be prepared by using relatively low pressure for injection of the mixture powders and low transportation gas temperature and thus, it has the merit in that it can be manufactured with low costs.

In particular, optimum wear resistance properties can be obtained in the process of forming a coating layer comprising metal matrix composite on a base material, using a cold spray process with aluminum metal particles and SiC ceramic particles.

Furthermore, the method of the invention forms a coating layer by kinetic energy of coating particles, not by thermal energy. Therefore, there is no possibility of applying heat shock to the base material or generating heat strain and also, there is no possibility of forming a new phase which has bad effects on the characteristics of the base material by reaction with the base material.

*Summary of Reference Number of Drawings*

| | |
|---|---|
| 2: convergence section | 4: throat section |
| 6: divergence/straight section | 8: exit column |
| 10: nozzle section | 12: injection port |
| 20: injection tube | 22: base point |
| 24: connection section | 30: buffer chamber |
| 110: gas compressor | 120: gas heater |
| 130: powder feeder | 140: nozzle |

MODE FOR THE INVENTION

The present invention is described in detail by way of the drawings and preferred embodiments.

The invention relates to a method of preparing a wear-resistant coating layer comprising metal matrix composite, which comprises the steps of providing a base material (S), preparing a mixture powder comprising a metal, alloy or mixture particle thereof having an average diameter of 50 to 100 um and a ceramic or mixture particle thereof having an average diameter of 25 to 50 um in a ratio of 1:1 to 3:1 by volume, injecting the mixture powder into a spray nozzle for coating, and coating the mixture powder on the surface of the base material by accelerating the mixture powder in the state of non-fusion at a rate of 300 to 1,200 m/s by the flow of transportation gas flowing in the nozzle.

Thus, the invention focuses on improvement in the wear resistance of coating layer in a method of preparing a coating layer comprising metal matrix composite on base materials using cold spray, and addresses optimal process conditions enabling the above improvement and the coating layer prepared thereby.

Figure 1:
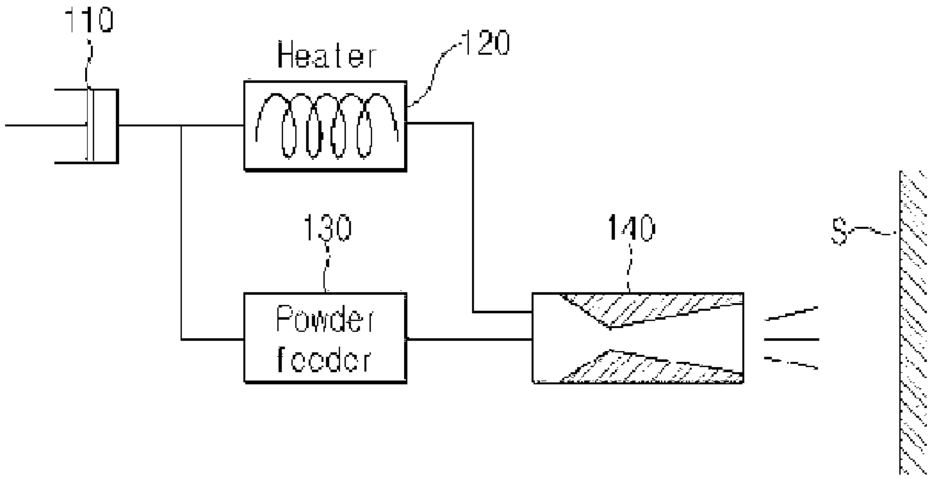
FIG. 1 is a schematic view of a cold spray apparatus which is used to prepare a coating layer comprising metal matrix composite in the invention.

Cold spray method itself is already known and the schematic view of an apparatus for such cold spray is shown in FIG. 1. In other words, FIG. 1 shows a schematic view of a cold spray apparatus (100) for preparing a coating layer on base material (S) in the invention.

The spray apparatus (100) provides the base material (S) with powders to form coating layer by accelerating them at subsonic or supersonic speed. For this purpose, the spray apparatus (100) comprises a gas compressor (110), gas heater (120), powder feeder (130), and nozzle for spray (140).

Compressed gas of about 5 to 20 kgf/cm$^2$ provided by the gas compressor (110) coats powders provided by the powder feeder (130) by ejecting them at a rate of about 300~1200 m/s through the nozzle for spray (140). For the nozzle for spray (140) as shown in FIG. 1, to generate the flow of subsonic or supersonic speed, convergence-divergence nozzle (de Laval-Type) is used and supersonic flow can be generated by such convergence and divergence process.

The gas heater (120) on the route to feed the compressed gas is an additional one for heating the compressed gas to increase its spray speed at the nozzle for spray by increasing kinetic energy thereof and it is not necessarily necessary. Also, as shown in the figure, to enhance the powder supply to the nozzle of spray (140), a portion of the compressed gas in the gas compressor (110) can be provided to the powder feeder (130).

For the compressed gas in the apparatus, common gas, for example, helium, nitrogen, argon and air can be used and it can be suitably selected in consideration of spray speed at the nozzle for spray (140) and costs.

For the detailed description about the operation and structure of the apparatus shown herein, see U.S. Pat. No. 5,302,414 by Alkhimov et al.

In the cold spray coating using such an apparatus, the first step is to provide a base material. The base material (S) can be various kinds of known materials requiring wear resistance. Particularly, the base material can be aluminum, aluminum alloys, especially, Al—Si or Al—Mg aluminum alloy, iron alloys such as cast iron, or semi-conductive materials such as silicone which are widely used as thermal, mechanical member. Preferably, the base material is aluminum or aluminum alloy because their poor wear resistance is greatly improved by the coating layer formation of the invention.

The metal, alloy or mixture particle thereof used in the invention can be selected from the group consisting of iron, nickel, aluminum, molybdenum, titanium and combination thereof. Further, the metal can be selected from the group consisting of iron alloy, nickel alloy, cupper alloy, aluminum alloy, molybdenum alloy, titanium alloy and combination thereof and for example, it can be aluminum, aluminum alloy, mixture of aluminum and aluminum alloy, mixture of aluminum and titanium, mixture of aluminum and titanium alloy and mixture of aluminum alloy and titanium alloy. In particular, it can be aluminum alloy or titanium alloy that can be often used as ordinary thermal, mechanical members. Preferably, the metal or alloy is aluminum or aluminum alloy because they are homogeneous with aluminum or aluminum alloy base materials which exhibit improved wear resistance by the coating layer formation of the invention.

The ceramic or mixture thereof in the invention can be various kinds of known ceramic and mixture thereof having excellent wear resistance and it can be oxides, carbides, or nitrides. Particularly, for the ceramic, there can be used metal oxides, metal carbides or metal nitrides and more particularly, oxides such as silicone oxide, zirconia, alumina, nitrides such as TiN and $Si_3N_4$, and carbides such as TiC and SiC can be used. It is preferable to use alumina or SiC to enhance wear resistance.

The ceramic particles to be mixed for the mixture powder in the invention can be provided in the form of agglomerated powders. The agglomerated powders are easy to be pulverized into fine particles and thus become fine particles when the powder particles collide with substrates in the coating process. Accordingly, it is advantageous in that the coating layer where fine ceramic particles are uniformly dispersed is formed.

Figure 2:
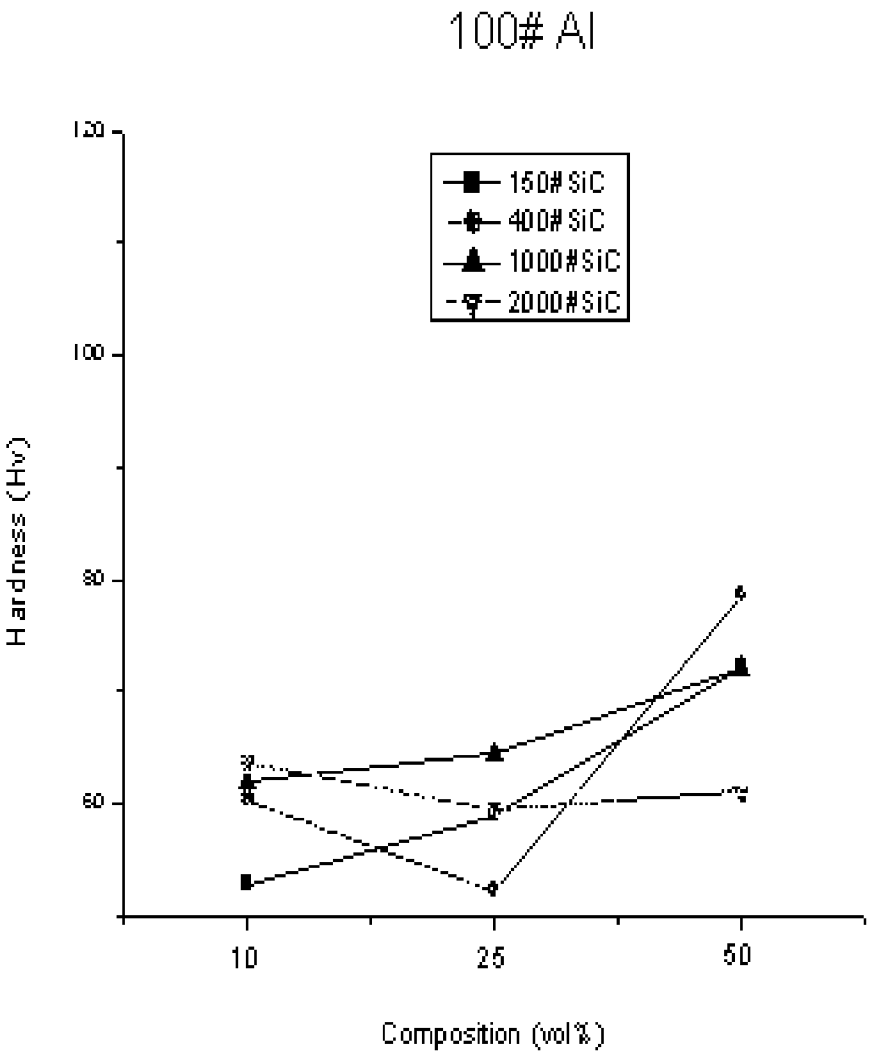
FIG. 2 to 4 show the hardness of coating layers according to change in particle size and ratio in the invention.
Figure 3:
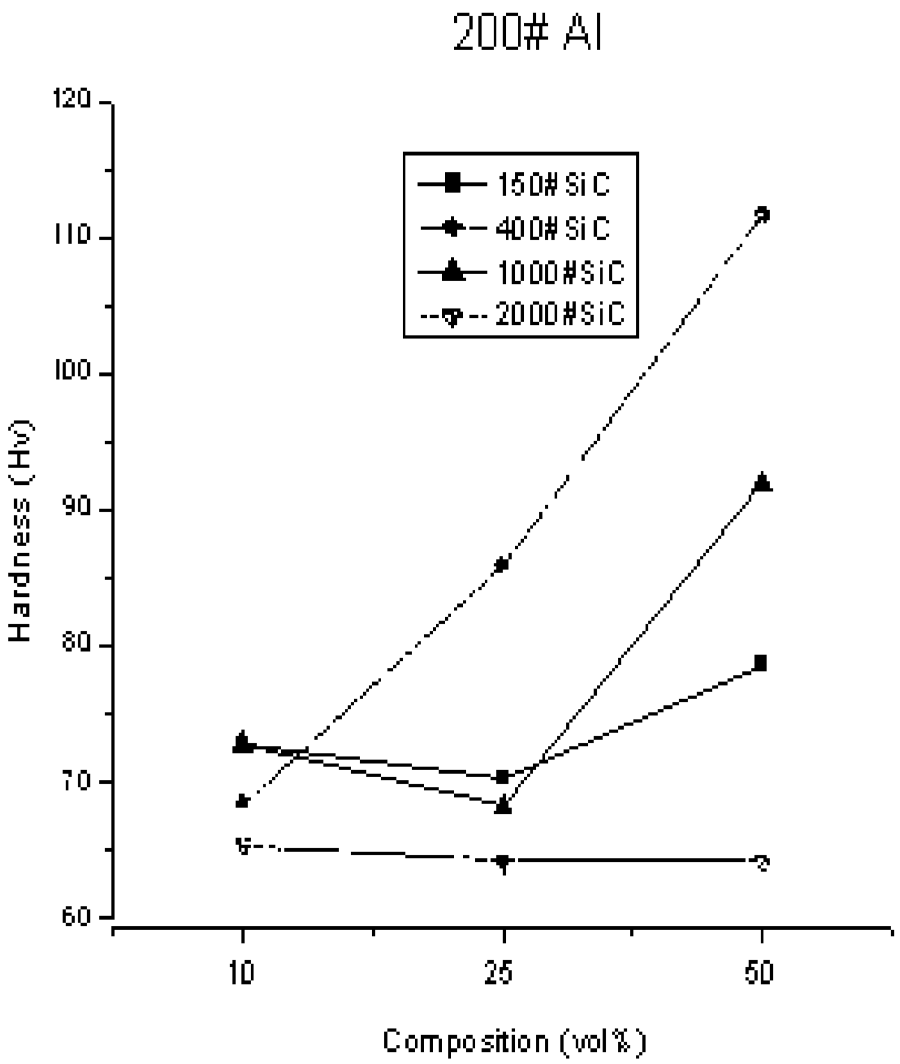
Figure 4:
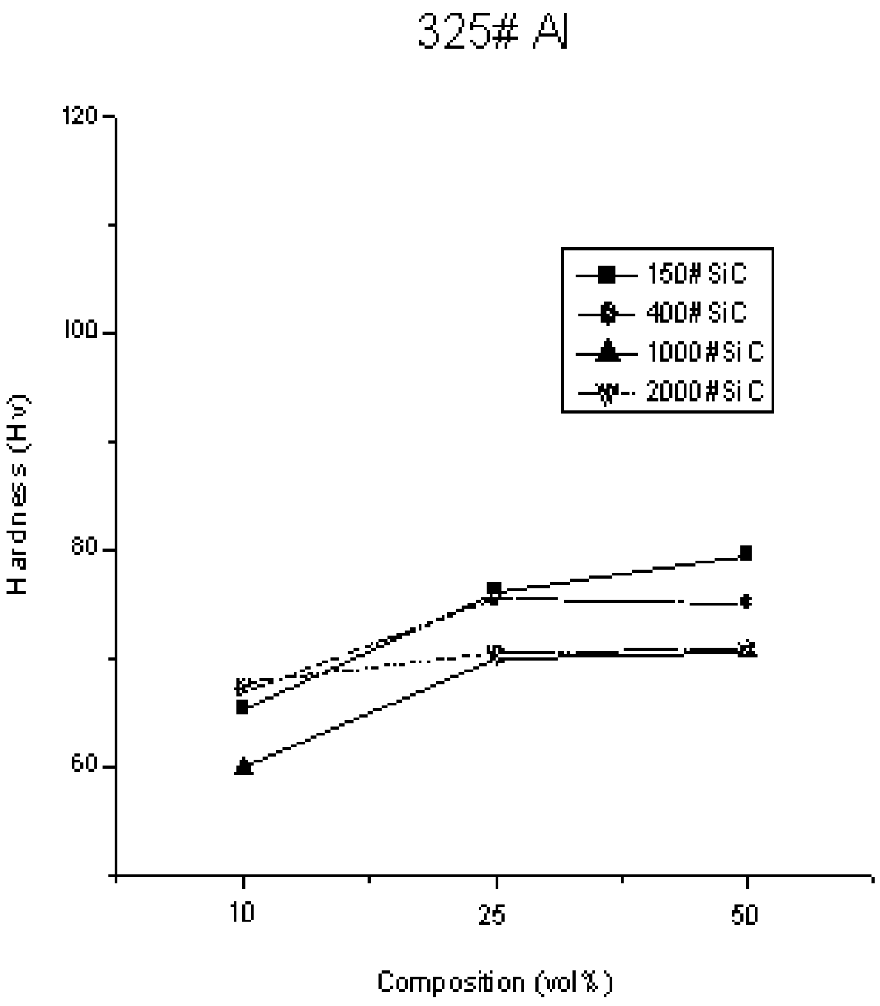

The metal, alloy or mixture particle thereof and the ceramic or mixture particle thereof to be mixed for the mixture powder have average diameters in the ranges of 50 to 100 um and 25 to 50 um respectively to maximize micro Vickers hardness value, which is a relative index of wear resistance, and are mixed in a ratio of 1:1 to 3:1 of metal:ceramic by volume. For example, when aluminum and SiC were mixed under the conditions that the particle size of aluminum varied from 100 mesh (average diameter: about 140 um), 200 mesh (average diameter: about 77 um), to 325 mesh (average diameter: about 44 um), the particle size of SiC varied from 150 mesh (average diameter: about 106 um), 400 mesh (average diameter: about 35 um), 1000 mesh (average diameter: about 13 um), to 2000 mesh (average diameter: about 6 um), and the mixing ratio varied from 10%, 25%, to 50% of SiC of the total mixture powder by volume, micro Vickers hardness values were measured after cold spray and they are shown in FIG. 2 (100 mesh aluminum used), FIG. 3 (200 mesh aluminum used) and FIG. 4 (325 mesh aluminum used). From the figures, it can be seen that when 200 mesh aluminum and 400 mesh SiC were mixed in a ratio of 25 to 50% by volume, high hardness value of not less than 80 Hv was obtained.

Figure 5:
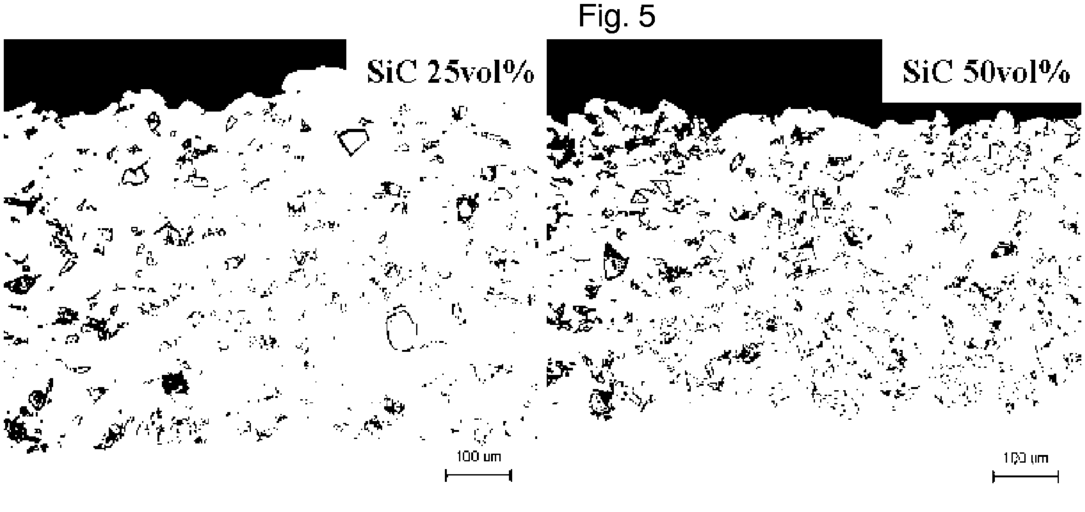
FIG. 5 to 8 show the fine structure of coating layers according to change in particle size and ratio in the invention.
Figure 6:
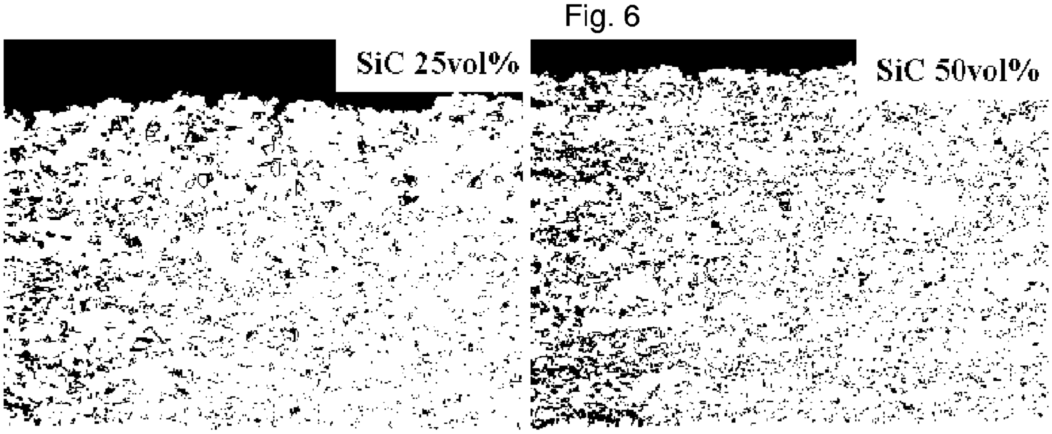
Figure 7:
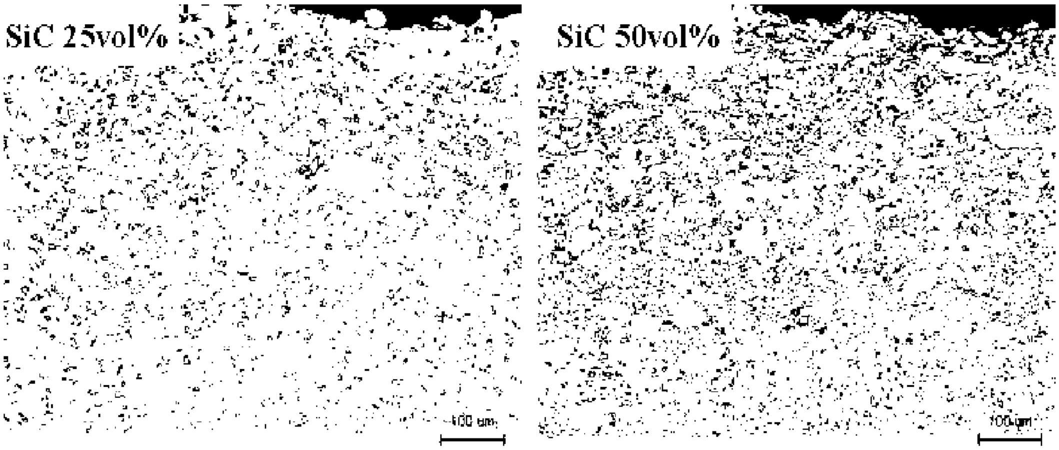
Figure 8:
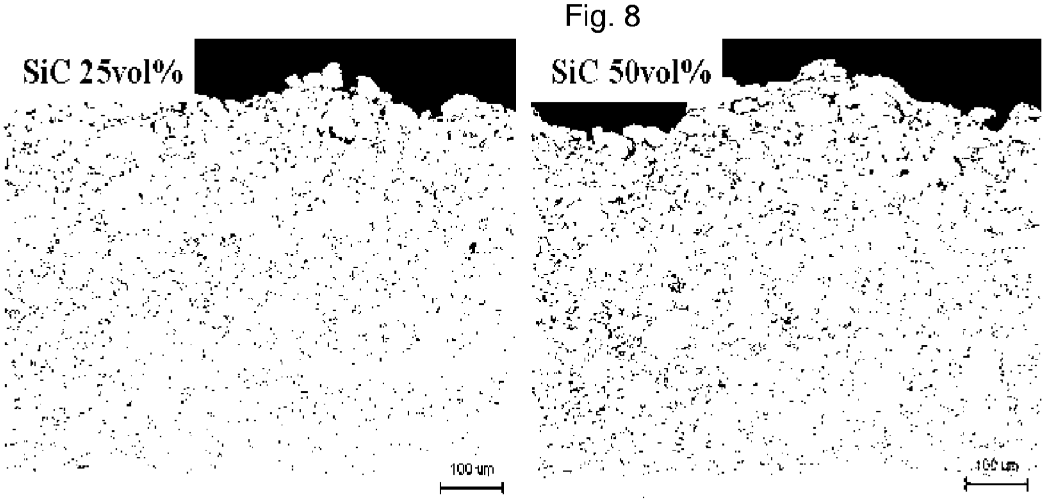

The above results can be deduced from morphology change according to the size and amount of SiC against the aluminum powder having the equal average diameter. The fine structures of the coating layers where the amount of SiC is 25% by volume and 50% by volume respectively are shown in FIG. 5 (200 mesh aluminum+150 mesh SiC used), FIG. 6 (200 mesh aluminum+400 mesh SiC used), FIG. 7 (200 mesh aluminum+1000 mesh SiC used) and FIG. 8 (200 mesh aluminum+2000 mesh SiC used). When the size of SiC is too big, the dispersion of SiC in the metal matrix composite is not performed properly and when the size is too small, it has texture type morphology due to the attraction between SiC particles as shown in FIG. 7 and FIG. 8 and thus dispersion effects decrease.

Furthermore, when the size of particles is too small, the weight of the particles is less and thus impulse becomes much less in spite of their fast speed when they collide with coating layers and as a result, processed hardening such as shot peening is less generated. On the other hand, when the size of particles is too big, although impulse is strong, the frequency and area of collision are less and thus processed hardening is also less generated. Thus, optimal medium size ranges exist to maximize the processed hardening.

Figure 9:
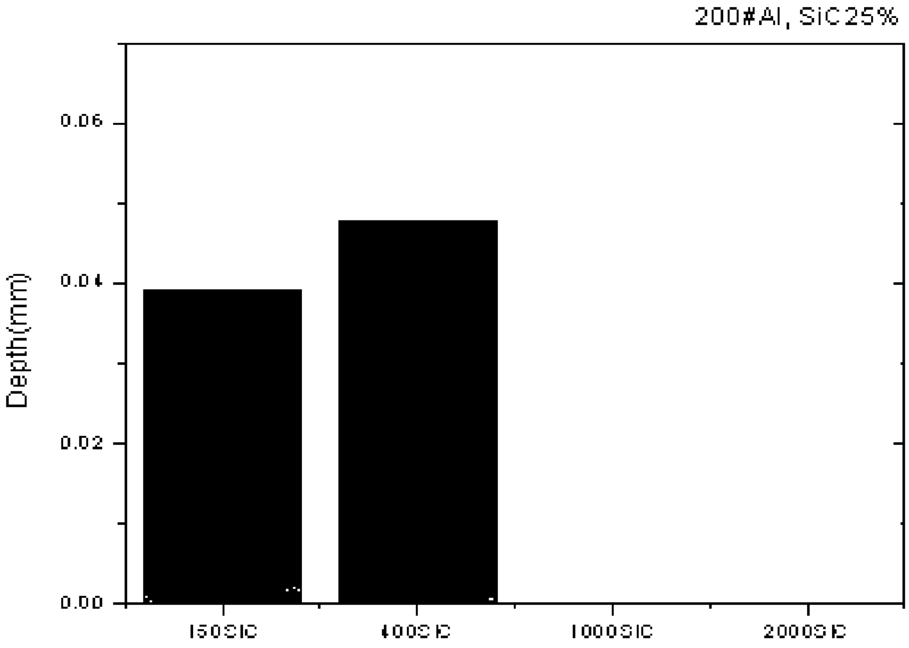
FIG. 9 to 12 show the abrasion amount of coating layers according to change in particle size and ratio in the invention.
Figure 10:
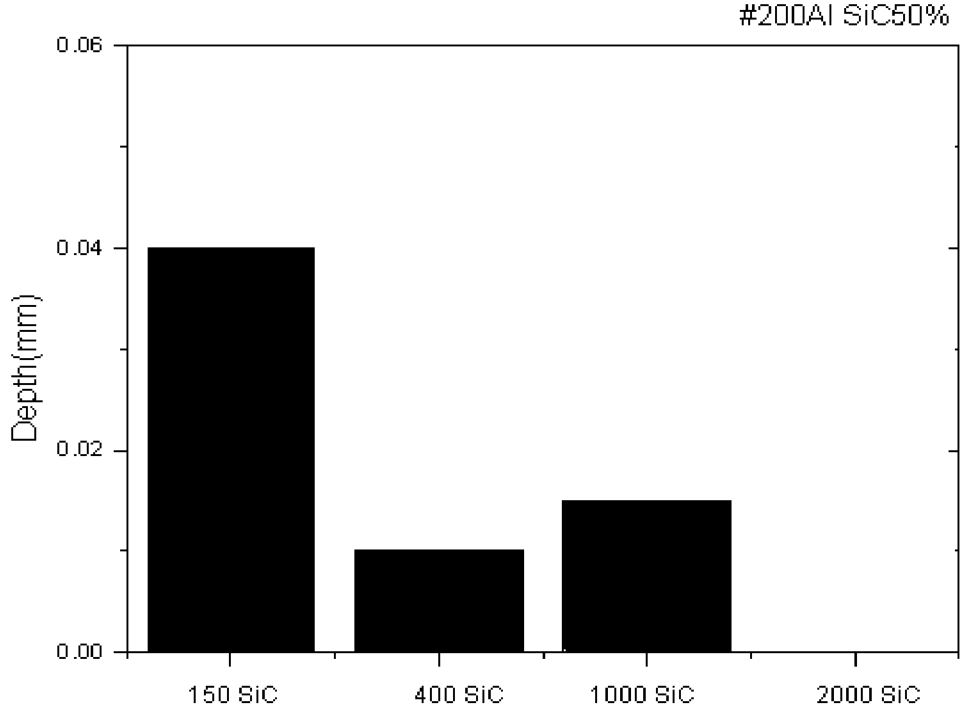
Figure 11:
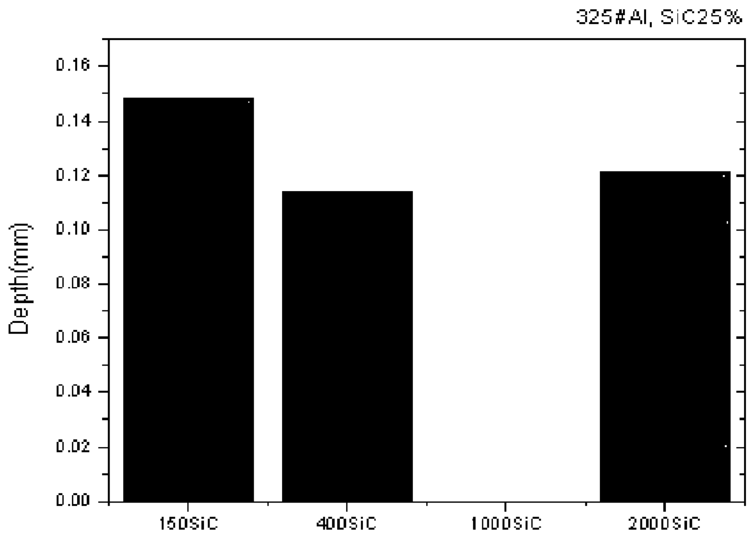
Figure 12:
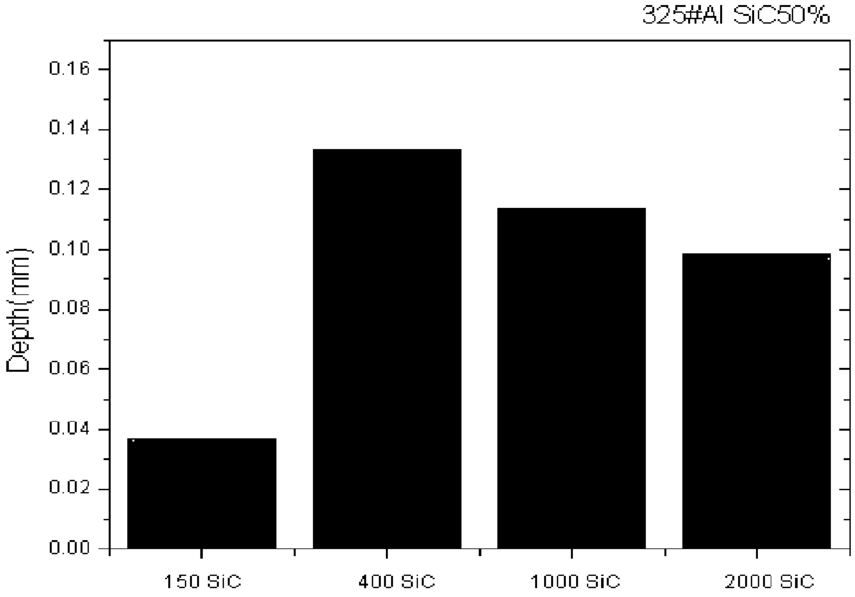
Figure 13:
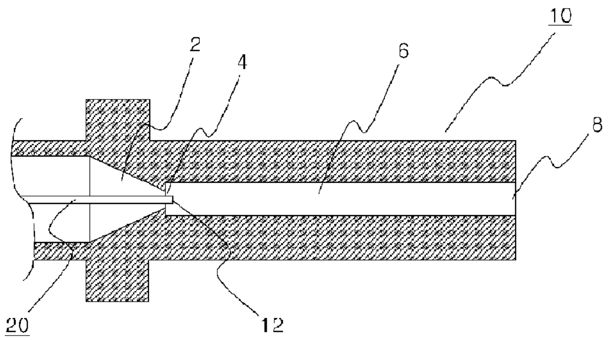
FIG. 13 to 16 illustrate an embodiment of the nozzle used to prepare a coating layer in the invention.
Figure 14:
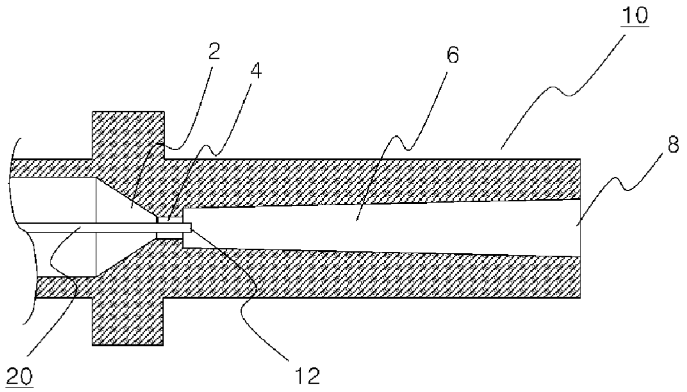
Figure 15:
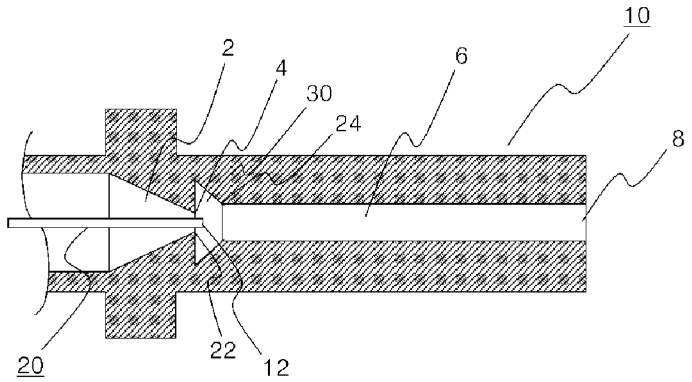
Figure 16:
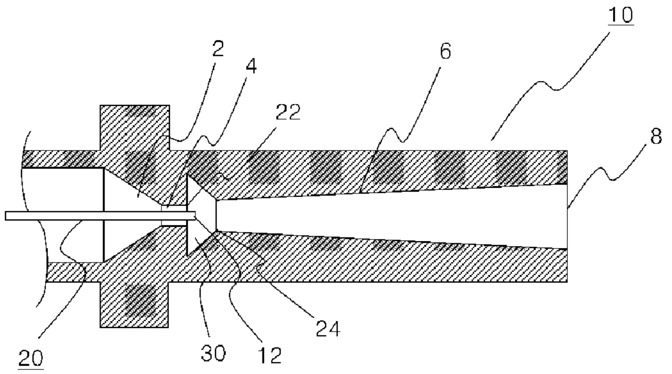

Further, wear resistance according to the size and mixing ratio of the particles was evaluated. The abrasion amounts measured were shown in FIG. 9 (200 mesh aluminum+SiC 25 vol. % used), FIG. 10 (200 mesh aluminum+SiC 50 vol. % used), FIG. 11 (325 mesh aluminum+SiC 25 vol. % used) and FIG. 12 (325 mesh aluminum+SiC 50 vol. % used) and they refer to abrasion amounts against the mesh size of SiC used. According to the results, it can be seen that abrasion performance was excellent when 200 mesh aluminum was mixed with SiC in a ratio of 25 to 50% by volume and particularly, when 200 mesh aluminum was mixed with 400 mesh SiC in a ratio of 50% by volume, excellent abrasion performance was obtained.

Therefore, according to abrasion amount, morphology and hardness test results, to use a mixture powder comprising a metal, alloy or mixture particle thereof having an average diameter of 50 to 100 um and a ceramic or mixture particle thereof having an average diameter of 25 to 50 um in a ratio of 1:1 to 3:1 by volume is advantageous to form an excellent wear-resistant coating layer and preferably, to use a mixture powder comprising an aluminum particle having an average diameter of 50 to 100 um and a SiC particle having an average diameter of 25 to 50 um in a ratio of 1:1 to 3:1 by volume is more advantageous.

The mixture powder of the ceramic or mixture particle thereof and the metal, alloy or mixture particle thereof can be prepared by conventional methods. As a simple method, the ceramic particles and metal particles can be dry mixed by v-mill. Dry mixed powders can be used in the powder feeder without further processing. Of the mixtures, the mixing ratio of the ceramic powder and the metal powder can be suitably adjusted according to its usage, but for the optimization of wear resistance, they are mixed within the ranges described above. For instance, when the volume ratio of the ceramic particles exceeds 50%, the coating layer may not be increased over a certain thickness.

Generally, convergence-divergence nozzles are used for the nozzle in the invention, and in case of having a common structure, a compressed gas of about 5~20 $kgf/cm^2$ is supplied to the mixture powder. For the compressed gas, helium, nitrogen, argon or air can be used. The gas is supplied, being compressed to about 5~20 kgf/cm by a gas compressor. If necessary, the compressed gas can be supplied in the state of being heated to the temperature of about 200~500° C. by heating means such as gas heater (120) in FIG. 1.

The cold spray process has various control parameters such as compression pressure against powder, flow rate of transportation gas and temperature of transportation gas but for the improvement of wear resistance, it is preferable that at most 50% of the powders sprayed from the nozzle participate in substantial coating process and the others fall apart after collision to contribute to processed hardening such as shot peening on the coating surface than that all of the sprayed powders are used for coating in respect to the improvement of hardness according to the processed hardening of coating layers and the increase of wear resistance. More preferably, the range of the coating efficiency is 10 to 20% in respect to the improvement of hardness and the increase of wear resistance.

Accordingly, if the above coating efficiency is maintained, it is preferable to keep the speed of the mixture powders relatively low when they are collided. As the speed is approximately in proportion to the square root of the temperature of the transportation gas, the temperature of the transportation gas supplied to the nozzle may be maintained relatively low when the mixture powders are coated through the nozzle. Preferably, the temperature of the transportation gas is 280±5° C. More preferably, this transportation gas temperature is advantageous for the mixture powder of aluminum metal and ceramic because it shows appropriate coating efficiency.

Also, in case that the metal is aluminum or aluminum alloy, if the speed of the powder to be coated on the base material is maintained at 300 to 500 m/s, the processed hardening effects of the coating layer as described above can be obtained irrelevantly to the types of the ceramic particles and accordingly, wear resistance can be maximized.

For the nozzle of the cold spray apparatus, besides ordinary convergence-divergence nozzles of de Laval-Type as described above, there can be used convergence-divergence nozzles or convergence-straight nozzles with throat as depicted in FIG. 13 to 16. The injection of the mixture powders can be carried out in the divergence or straight section of the nozzle via an injection tube located through a throat. As the injection of the mixture powders is carried in the divergence or straight section at a relatively low pressure, the pressure for the injection of the mixture powder can be maintained low and it is thus possible to design a cold spray apparatus with low cost and further, as the powders are injected in the divergence or straight section, it is possible to prevent the powders from being coated inside the nozzle, especially, throat and accordingly, long time operation is possible.

Accordingly, in the case that the nozzle and injection tube as described above are used, it is preferred that the pressure when the mixture powders are injected into the nozzle is as low as 90 to 120 psi, which is much lower than the ordinary pressure.

More preferably, in the case that the nozzle and injection tube of the above forms are used, the pressure when the mixture powders are injected into the nozzle is 90 to 120 psi and the temperature of the transportation gas is 280±5° C. in respect to the formation of coating layers with excellent wear resistance and, in particular, the metal is aluminum and the ceramic is SiC.

Furthermore, in the coating stage, before the mixture powder comprising the metal, alloy or mixture particle thereof and the ceramic or mixture particle thereof in a ratio of 1:1 to 3:1 by volume, a mixture powder containing a ceramic or mixture particle in a ratio lower than the said ratio can be coated in advance. In other words, one or more layers having low ceramic contents can be included. Also, alternatively, before the mixture powder comprising the metal, alloy or mixture particle thereof and the ceramic or mixture particle thereof in a ratio of 1:1 to 3:1 by volume, a mixture powder containing a ceramic or mixture particle thereof in a ratio lower than the said ratio can be coated and then the ratio is increased to contain the ceramic or mixture particle thereof in a higher rate until the final volume reaches the ratio of 1:1 to 3:1 as the mixture powder is coated from the surface of the base material to the surface of the coating layer. In other words, the coating can be carried out so that the concentration gradient of the ceramic particles can be generated according to the thickness of from the base material to the coating layer edge.

The formation of such additional layers can minimize the heat stress which is generated by thermal expansion coefficients between the base material and the coating layer and also activate heat transfer thereby minimizing peeling, residual stress, etc. which might be generated by heat cycling.

For the formation of such additional intermediate layers, it is preferred that the metal is aluminum and the ceramic is SiC in that difference in the thermal expansion coefficients of aluminum and SiC can be overcome.

Further, after such coating process is carried out, the invention can further comprise a thermal treatment step where thermal annealing treatment is carried out at an anneal temperature of the metal, alloy or mixture thereof. In other words, the coating layer formed by the aforementioned processes can be subject to suitable post-treatments, if necessary. For example, the post-treatments may include mechanical processing for surface illumination control or thermal treatment for the improvement of the adhesion of the coating layer.

Also, the invention provides a wear-resistant coating layer comprising metal matrix composite prepared by the aforementioned method. The thickness of the coating layer is preferably 10 um to 1 mm. If it is too thin, wear resistance is decreased and if it is thick, it will be expensive to prepare a coating layer, and peeling or heat stress may be generated by thermal expansion.

More preferably, the metal is aluminum and the ceramic is SiC and the hardness of the coating layer thus prepared is at least 80 Hv in terms of micro Vickers hardness.

The wear-resistant coating layer comprising metal matrix composite prepared by the method of the invention enhances the characteristics of the base material or the coating itself.

First, the wear resistance of the member can be improved by containing ceramic particles of high hardness in the coating layer.

Second, the coating layer prepared by the invention enhances the fatigue properties of the parts coated thereon. Thus, strong binding between the coating layer and the base material inhibits crack from being generated and as the coating layer possesses the characteristics of metal matrix composite, its fine structure reduces the generation of crack and its propagation rate and therefore, fatigue properties are enhanced. In addition, it helps the parts have high resistance against thermal fatigue destruction. One of the main causes of the generation and propagation of crack in the parts used in heat resistant engines such as gas turbines is heat stress due to local temperature difference. Also, in engine blocks, a portion close to the cylinder has high temperature and a portion far from the cylinder has low temperature due to combustion of the engine. Such temperature difference generates heat stress, which causes crack on the engine block surfaces. In particular, where periodical combustion and cooling occur, for example, in engines, it is very important to control heat fatigue destruction properties by periodical heat stress. The thermal conductivity properties of the member can be enhanced by preparing a coating layer using particles having high thermal conductivity such as aluminum or aluminum alloy as a metal and SiC as a ceramic in the invention. The improvement of the thermal conductivity properties reduces temperature difference existing in the member thereby resulting in improvement in the heat fatigue destruction properties of the member. Further, as the formation of the composite can reduce difference in thermal expansion coefficient from the base material, heat stress occurring during heating can be reduced and thus, the peeling and crack generation of the coating layers can be minimized.

The invention is not restricted by the detailed description of the invention and the drawings, and it will be obvious to those skilled in the art that various changes and modifications may be made therein without departing from the scope of the invention as defined by the appended claims.

Industrial Applicability

According to the method of preparing a wear-resistant coating layer comprising metal matrix composite and the coating layer prepared using the same in the invention, a coating layer having optimum wear resistance and excellent resistance against fatigue crack can be obtained and in addition, its heat fatigue properties can be improved. The coating layer prepared can be used as a surface coating of mechanical parts used in abrasive environments or engine parts operated under periodical heat stress environments. It improves wear resistance properties and fatigue properties by inhibiting crack generation and propagation and additionally, it can minimize the peeling between the coating layer and the base material or the crack of the coating layer by controlling thermal expansion coefficients and improving heat conductivity properties, thereby improving resistance against heat fatigue crack.

In addition, the coating layer can be prepared by using relatively low pressure for injection of the mixture powders and low transportation gas temperature and thus, it has the merit in that it can be manufactured with low costs.

In particular, optimum wear resistance properties can be obtained in the process of forming a coating layer comprising metal matrix composite on a base material, using a cold spray process with aluminum metal particles and SiC ceramic particles.

Furthermore, the method of the invention forms a coating layer by kinetic energy of coating particles, not by thermal energy. Therefore, there is no possibility of applying heat shock to the base material or generating heat strain and also, there is no possibility of forming a new phase which has bad effects on the characteristics of the base material by reaction with the base material.

The invention claimed is:

1. A deposition method comprising:

providing a base material;

preparing a powder mixture that includes (a) a metallic component comprising at least one of Al, an Al alloy, and a mixture of Al and an Al alloy and (b) a ceramic component comprising at least one of SiC, $Al_2O_3$, and a mixture of SiC and $Al_2O_3$;

injecting the powder mixture into a spray nozzle; and depositing the powder mixture onto the base material by accelerating the powder mixture in a state of non-fusion at a rate between about 300 m $sec^{-1}$ and about 1200 m $sec^{-1}$ via a transportation gas flowing in the spray nozzle;

wherein the metallic component is sized to pass through a 200 mesh sieve and the ceramic component has an average particle diameter between about 13 μm and about 35 μm; and wherein the ceramic component comprises at least about 50 vol % of the powder mixture.

2. The method of claim 1, wherein the ceramic component is provided in the form of agglomerated powders.

3. The method of claim 1, wherein the base material comprises at least one of aluminum, aluminum alloy and cast iron.

4. The method of claim 1, wherein less than 50% of the powder mixture injected into the spray nozzle is deposited onto the base material.

5. The method of claim 1, wherein the rate is between about 300 m $sec^{-1}$ and about 500 m/s.

6. The method of claim 1, wherein the powder mixture is injected into the spray nozzle with a pressure between about 90 psi and about 120 psi.

7. The method of claim 1, wherein the transportation gas in the spray nozzle has a temperature between about 275° C. and about 285° C.

8. The method of claim 1, further comprising conducting a thermal annealing treatment after depositing the powder mixture, wherein the thermal annealing treatment is carried out at an anneal temperature of the metallic component.

9. The method of claim 1, wherein:

the spray nozzle is a convergence-straight spray nozzle; and the powder mixture is injected into a straight section of the spray nozzle via an injection tube positioned along a central axis of the spray nozzle.

10. The method of claim 1, wherein:

the spray nozzle is a convergence-divergence spray nozzle; and the powder mixture is injected into a divergence section of the spray nozzle via an injection tube positioned along a central axis of the spray nozzle.

11. The method of claim 1, further comprising providing at least one of the metallic component and the ceramic component to the spray nozzle at a rate that varies with time, such that the powder mixture that is deposited onto the base material has a ratio of metallic component to ceramic component that varies with depth of deposition.

12. The method of claim 1, further comprising depositing the powder mixture onto the base material to a depth that is between about 10 μm and about 1 mm.

* * * * *

UNITED STATES PATENT AND TRADEMARK OFFICE

CERTIFICATE OF CORRECTION

PATENT NO. : 8,486,496 B2
APPLICATION NO. : 11/911416
DATED : July 16, 2013
INVENTOR(S) : Kyung-hyun Ko et al.

It is certified that error appears in the above-identified patent and that said Letters Patent is hereby corrected as shown below:

On the Title Page, item 73, in the Assignee of the patent: “SCK Solmics Co., Ltd.” should be “SKC Solmics Co., Ltd.”

Signed and Sealed this
Thirty-first Day of December, 2013

Margaret A. Focarino

*Commissioner for Patents of the United States Patent and Trademark Office*